United States Patent Office 3,336,418
Patented Aug. 15, 1967

3,336,418
VINYL RESINS PLASTICIZED WITH UNSATURATED ACRYLYLOXYALKYL ESTERS
Dale Robert Dill, Webster Groves, Mo., assignor to Monsanto Company, St. Louis, Mo., a corporation of Delaware
No Drawing. Filed May 19, 1964, Ser. No. 368,695
15 Claims. (Cl. 260—884)

This invention relates to new and useful compositions comprising halogen-containing vinyl resins and relates more particularly to compositions comprising halogen-containing vinyl resins plasticized with acrylyloxyalkyl esters. The invention has special utility for the production of halogen-containing vinyl resin plastisols, organosols and dry blends, wherein said acrylyloxyalkyl esters function effectively as polymerizable plasticizers which significantly improve certain physical properties of the starting resin.

Halogen-containing vinyl resins, such as polyvinyl chloride and its copolymers, which are widely employed in the plastics industry, are generally hard and brittle in their unplasticized state. Although unplasticized polyvinyl chloride has an indefinite flexibility point of approximately 75° C. to 80° C., the unplasticized resins do not become fused, fluid, pliable, mobile or workable up to temperatures of 165–175° C. Moreover, because of the fact that these polyvinyl resins do not have definite fusion points and do not become fluid at temperatures below their decomposition temperatures, the unplasticized resins cannot be processed by wet-milling, extruding or molding, and, particularly, these materials cannot be used for rotational casting techniques.

To overcome many of these difficulties, it is common practice to intimately mix polyvinyl chloride resins with plasticizing compounds such as dioctyl phthalate and tricresyl phosphate. Such plasticized compositions are easily and readily worked on roll mills, and films and sheets formed therefrom are supple and flexible, these characteristics being desirable for many applications. Said compositions may also be readily molded or extruded, although the molded or extruded articles possess a softness, flexibility or nonrigidity which is undesirable in this type of article. In many applications, it is desirable to use resin compositions prepared by conventional formulation methods which, upon fusion and curing, result in hard and rigid finished articles.

It is an object of this invention to provide improved halogen-containing vinyl resin compositions. A further object is to provide novel plastic compositions comprising halogen-containing resins and certain acrylyloxyalkyl esters.

A still further object of this invention is to provide new polymerizable plasticizers for vinyl polymers and copolymers.

Another object is to provide new resin compositions which may be easily prepared by conventional formulation methods which, upon fusion and curing, result in a hard, rigid material.

Further objects will be apparent to those skilled in the art from the following description and claims.

In accordance with this invention, it has been found that a resinous composition comprising a halogen-containing vinyl resin and, as a polymerizable plasticizer, an acrylyloxyalkyl ester of the type herein described, may be fused and cured to a hard, rigid material. The aforementioned compositions are prepared in a well-known manner.

Generally speaking, about 5 to about 200 parts of plasticizer may be used for each 100 parts of halogen-containing vinyl resin. However, it is preferred to use from about 20 to about 100 parts of plasticizer per 100 parts of resin.

The invention is particularly applicable to polymerizable vinyl chloride resin and to resins formed by conjoint polymerization of vinyl chloride with other materials such as vinyl acetate, vinyl propionate, vinylidene chloride, methyl methacrylate or diethyl maleate, preferably wherein vinyl chloride comprises at least 50% of the copolymer resin.

In order to facilitate the curing of the polymerizable plasticizer in the resin within a practicable time, it is preferred to incorporate from about 0.5% to 5% of a polymerization catalyst, based on the weight of the polymerizable plasticizer. While any of the usual peroxy polymerization catalysts such as benzoyl peroxide, acetyl peroxide, succinyl peroxide, methyl ethyl ketone peroxide, cumene hydroperoxide, t-butyl hydroperoxide, t-butyl perbenzoate, perbenzoic acid, peracetic acid and chlorine substituted aryl peroxides are effective, it is preferred to use t-butyl perbenzoate or benzoyl peroxide.

The usual heat stabilizers and light stabilizers may also be present in the resinous composition. Fillers and coloring materials, well known to those familiar with the art, may also be added to the resin if desired.

The polymerizable plasticizers which are employed in the practice of this invention are acrylyloxyalkyl esters selected from the group consisting of those having the formulae,

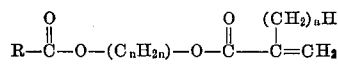

and

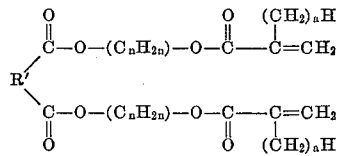

wherein:

R is a member of the group consisting of alykl of 2 to 20 carbon atoms, alkenyl of 2 to 20 carbon atoms, phenyl, naphthyl, lower alkyl substituted phenyl of 7 to 10 carbon atoms and hydroxyl alkyl of 2 to 18 carbon atoms;

R' is a member of the group consisting of alkylene of 2 to 20 carbon atoms, alkenylene of 2 to 20 carbon atoms, phenylene and naphthylene;

$n$ is an integer from 2 to 10; and $a$ is an integer from 0 to 1.

The acrylyloxyalkyl esters of this invention are prepared by charging a reaction vessel with a hydroxyalkyl acrylate, an organic carboxylic acid and an esterification catalyst. The mixture is heated to cause esterification and removal of water. The reaction product is then steam sparged under vacuum and dried.

The hydroxyalkyl acrylates which are suitable for use in preparing the polymerizable plasticizers of this invention include 2-hydroxyethyl methacrylate, 2-hydroxypropyl methacrylate, 3-hydroxypropyl methacrylate, 2-hydroxybutyl methacrylate, 3-hydroxybutyl methacrylate, 4-hydroxybutyl methacrylate, 6-hydroxyhexyl methacrylate, 8-hydroxyoctyl methacrylate, 10-hydroxydecyl methacrylate, 2-hydroxymethyl acrylate, 2-hydroxypropyl acrylate, 3-hydroxypropyl acrylate, 2-hydroxybutyl acrylate, 3-hydroxybutyl acrylate, 4-hydroxybutyl acrylate, 6-hydroxyhexyl acrylate, 8-hydroxyoctyl acrylate and 10-hydroxydecyl acrylate.

The organic carboxylic acids which are suitable for use in preparing the acrylyloxyalkyl ester plasticizers of this invention include saturated and unsaturated mono- and polycarboxylic acids. Non-limiting examples of such acids are saturated aliphatic monocarboxylic acids such as acetic, propionic, butyric, ethyl butyric, caproic, enanthic, caprylic, pelargonic, decanoic, undecanoic, lauric, myristic, palmitic, stearic, arachidic and the like; the unsaturated aliphatic monocarboxylic acids such as acrylic, methacrylic, crotonic, iso-crotonic, decyldenic, palmitoleic, oleic, linoleic and the like; the saturated aliphatic dicarboxylic acids such as oxalic, malonic, succinic, glutaric, adipic, pimelic, suberic, azelaic, sebacic and the like; the unsaturated aliphatic dicarboxylic acids such as maleic, fumaric, itaconic, citraconic, mesaconic and the like; aryl carboxylic acids such as benzoic, naphthoic, phthalic, isophthalic, terephthalic, naphthalic, toluic and the like; and hydroxycarboxylic acids such as hydroxy acetic acid, $\beta$-hydroxy propionic acid, ethylidene lactic acid, hydroxy butyric acid, $\alpha$-hydroxy propionic acid, hydroxy caproic acid, hydroxy stearic acid, tartronic acid, tartaric acid, malic acid and the like. Preferred acids of the aforementioned groups comprise the organic carboxylic acids containing from 2 to 18 carbon atoms.

Where it is desired, the corresponding anhydride or acid chloride of any of the above acids, if available, may be employed in place of the acid per se. The following detailed description will more fully illustrate the preparation of the acrylyloxyalkyl esters of this invention.

The acrylyloxyalkyl esters of this invention are prepared by charging a reaction vessel with a hydroxyalkyl acrylate, an organic carboxylic acid and an esterification catalyst. The mixture is heated to cause esterification and removal of water. The reaction product is then steam sparged under vacuum and dried. The following detailed description will more fully illustrate the preparation of the acrylyloxyalkyl esters of this invention.

Example 1

A suitable reaction vessel is charged with 98.1 grams (1.0 mol) of maleic anhydride, 286 grams (2.2 mols) of 2-hydroxyethyl methacrylate, 5 grams of toluenesulfonic acid, 0.85 gram of hydroquinone and 130 ml. of toluene. The mixture is heated to refluxing for 29 hours at 115° C. and 400 mm. pressure. The water evolved in the reaction is removed by a modified Dean-Stark trap. Upon completion of removal of water by azeotropic distillation, the reaction mixture is then steam sparged and dehydrated under vacuum. There is obtained 161.5 grams of di(methacrylyloxyethyl)maleate.

Example 2

Following the procedure of Example 1, 172.3 grams (1.0 mol) of decanoic acid, 143.0 grams (1.1 mols) of 2-hydroxyethyl methacrylate, 4.0 grams of toluenesulfonic acid and 200 ml. of toluene are utilized to prepare methacrylyloxyethyl decanoate in good yield.

Example 3

Following the procedure of Example 1, 202.5 grams (1.0 mol) of oleic acid, 143.0 grams (1.1 mols) of 2-hydroxyethyl methacrylate, 4.0 grams of toluenesulfonic acid and 200 ml. of toluene are utilized to prepare methacrylyloxyethyl oleate in good yield.

Example 4

Following the procedure of Example 1, 134.1 grams (1.0 mol) of malic acid, 286.0 grams (2.2 mols) of 2-hydroxyethyl methacrylate, 4.0 grams of toluenesulfonic acid and 200 ml. of toluene are utilized to prepare di(methacrylyloxyethyl)malate in good yield.

Example 5

A suitable reaction vessel is charged with 148.1 grams (1.0 mol) of phthalic anhydride, 269 grams (2.06 mols) of 2-hydroxyethyl methacrylate, 4.0 grams of toluenesulfonic acid and 325 ml. of toluene. The mixture is heated to refluxing for 20 hours at 130° C. The water evolved in the reaction is removed by a modified Dean-Stark trap. Upon completion of removal of water by azeotropic distillation, the reaction mixture is washed several times with lye and water washes. The reaction mixture is then steam sparged and dehydrated under vacuum. There is obtained di(methacrylyloxyethyl) phthalate in good yield.

Example 6

Following the procedure of Example 5, 116.07 grams (1.0 mol) of fumaric acid, 286.0 grams (2.2 mols) of 2-hydroxyethyl methacrylate, 4.0 grams of toluenesulfonic acid and 200 ml. of benzene are utilized to prepare di(methacrylyloxyethyl)fumarate in good yield.

Example 7

Following the procedure of Example 5, 148.01 grams (1.0 mol) of phthalic anhydride, 317.02 grams (2.2 mols) of 2-hydroxypropyl methacrylate, 4.0 grams of toluenesulfonic acid and 200 ml. of toluene are utilized to prepare di(methacrylyloxy-2-propyl)phthalate in excellent yield.

Example 8

Following the procedure of Example 5, 122.09 grams (1.0 mol) of benzoic acid, 143.0 grams (1.1 mols) of 2-hydroxyethyl methacrylate, 4.0 grams of toluenesulfonic acid and 200 ml. of toluene are utilized to prepare methacrylyloxyethyl benzoate in good yield.

Example 9

Following the procedure of Example 5, 146.11 grams (1.0 mol) of adipic acid is substituted for the phthalic anhydride. There is obtained di(methacrylyloxyethyl) adipate in high yield.

Example 10

Following the procedure of Example 5, 148.1 grams (1.0 mol) of phthalic anhydride, 239.2 grams (2.06 mols) of 2-hydroxyethyl acrylate, 4.0 grams of toluenesulfonic acid and 200 ml. of toluene are utilized to prepare di(acrylyloxyethyl) phthalate in good yield.

The halogen-containing resins of this invention are those derived from such vinyl compounds as vinyl chloride, vinylidene chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of vinyl halide, such as vinyl chloride, with such materials as vinylidene chloride; vinyl esters of carboxylic acid, e.g., vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compounds, e.g., styrene, ortho-chlorostyrene, para-chlorostyrene, 2,5-dichlorostyrene, 2,4-dichlorostyrene, para-ethyl styrene, vinyl naphthalene, $\alpha$-methyl styrene; dienes such as butadiene, chlorobutadiene; unsaturated amides such as acrylic acid amide, acrylic acid anilide; unsaturated nitriles such as acrylic acid nitrile; and esters of $\alpha,\beta$-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids and the like.

It should be recognized that the halogenated resins containing halogens other than chlorine, e.g., bromine, fluorine and iodine, are also operable in this invention. Said halogenated resins may contain a varying proportion of halogen, depending upon the nature of the resin and its contemplated use. Those copolymers in which a predominant portion (i.e., more than 50% by weight of the copolymer) is made from a halogen-containing vinyl compound, such as vinyl chloride, represent a preferred class of polymers to be treated according to this invention.

The polymerizable plasticizers of this invention are not only compatible with the various vinyl resins described above, but are also compatible with the known non-polymerizable ester plasticizers commonly employed with such resins. Illustrative of these latter plasticizers are the alkyl and aryl phosphates, the alkyl phthalates, adipates, sebacates and azelates, and the epoxidized vegetable oils. Specific examples of such known plasticizers include tri-(2-ethylthexyl)phosphate, tricresyl phosphate, di-(2-ethylhexyl)phthalate and the corresponding adipate, dioctyl sebacate, and epoxidized soybean oils.

The polymerizable plasticizers of this invention are also compatible with various unsaturated monomeric compounds which are employed as cross-linking agents in resinous compositions. Such monomeric cross-linking agents include vinyl compounds such as vinyl benzoate, vinyl crotonate, cyanovinyl acetate, vinyl toluene, divinyl toluene, bis(β-chloroethyl)vinyl phosphonate, butyl vinyl ether and the like, and polyallyl esters such as diallyl adipate, triallyl citrate, diallyl phthalate, diallyl sebacate and the like.

Excellent resinous compositions have been made by intimately mixing a halogen-containing vinyl resin with a mixture of an acrylyloxyalkyl ester plasticizer and one of the non-polymerizable plasticizers described above. The ratio of acrylyloxyalkyl ester to non-polymerizable plasticizer will vary over a wide range, depending upon the type of resin and the final properties desired. A major proportion of either plasticizer can be employed.

The invention will be more fully understood by reference to the following examples which further illustrate the valuable aspects of the invention.

The following testing procedures are used in evaluating the physical properties of plasticizers.

|  | A.S.T.M. |
| --- | --- |
| Heat distortion | 1043–51 |
| Volatility | D–1203 |
| Tensile properties | D–882–56T |
| Hardness | D–676–58T |

Toughness is defined as the area under the stress-strain curve obtained in test procedure A.S.T.M. D–882–56T.

*Example 11*

Sixty parts by weight of di(methacrylyloxyethyl) maleate, prepared in Example 1, are incorporated with 100 parts by weight of polyvinyl chloride, and the resulting resinous composition is pressure molded for 12 minutes at 160° C. There is obtained a hard and rigid plasticized material having a Shore hardness of 76, a heat distortion temperature of 51° C., a volatility value of 0.59%, a tensile strength of 5960 p.s.i., a toughness value of 1645 lbs./in.² and an elongation value of 65%.

*Examples 12–17*

The plasticizer in Example 11 is replaced with 60 parts by weight of the following plasticizers:

(12) di(methacrylyloxyethyl)phthalate.
(13) di(methacrylyloxyethyl)fumarate.
(14) di(methacrylyloxy-2-propyl)phthalate.
(15) methacrylyloxyethyl benzoate.
(16) di(methacrylyloxyethyl)adipate.
(17) di(acrylyloxyethyl)phthalate.

The plasticized resins are hard and rigid and exhibit physical properties similar to those demonstrated in Example 11.

Replacement of the polyvinyl chloride in the above formulations with the following copolymers yields hard and rigid compositions having similar properties.

85% vinyl chloride—15% vinyl acetate
80% vinyl chloride—20% vinylidene chloride
90% vinyl chloride—10% methyl acrylate
80% vinyl chloride—20% ethyl methacrylate.

While this invention has been described with respect to certain embodiments, it is not so limited, and it is to be understood that variations and modifications thereof may be made without departing from the spirit or scope of this invention.

The embodiments of the invention in which an exclusive property or privilege is claimed are defined as follows:

1. A composition comprising an intimate mixture of a vinyl halide polymer selected from the group consisting of polymerized vinyl halide monomers and the copolymers of such monomers with an ethylenically unsaturated monomer, at least 50% of the monomer units of said copolymers being vinyl halide units, and an acrylyloxyalkyl ester of the formula

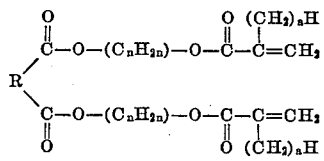

wherein:

R is a member of the group consisting of alkylene of 2 to 20 carbon atoms, alkenylene of 2 to 20 carbon atoms, phenylene and naphthylene;
n is an integer from 2 to 10; and
a is an integer from 0 to 1; said acrylyloxyalkyl ester being present in amounts of from about 5 to about 200 parts by weight per 100 parts by weight of vinyl halide polymer.

2. A composition as defined in claim 1 wherein the acrylyloxyalkyl ester is present in amounts of from about 20 to about 100 parts by weight per 100 parts by weight of vinyl halide polymer.

3. A composition comprising an intimate mixture of a vinyl chloride polymer selected from the group consisting of polymerized vinyl chloride monomers and the copolymers of such monomers with an ethylenically unsaturated monomer, at least 50% of the monomer units of said copolymers being vinyl chloride units, and a methacrylyloxylalkyl ester of the formula

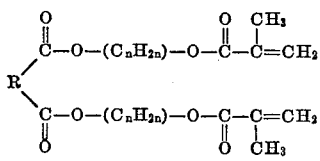

wherein:

R is a member of the group consisting of alkylene of 2 to 20 carbon atoms, alkenylene of 2 to 20 carbon atoms, phenylene and naphthylene; and
n is an integer from 2 to 10; said methacrylyloxyalkyl ester being present in amounts of from about 5 to about 200 parts by weight per 100 parts by weight of vinyl chloride polymer.

4. A composition as defined in claim 3 wherein the methacrylyloxyalkyl ester is present in amounts of from about 20 to about 100 parts by weight per 100 parts by weight of vinyl chloride polymer.

5. The composition of claim 3 wherein the vinyl chloride polymer is polyvinyl chloride.

6. The composition of claim 3 wherein the vinyl chloride polymer is a vinyl chloride-vinyl acetate copolymer.

7. A composition comprising an intimate mixture of polyvinyl chloride and di(methacrylyloxyethyl)phthalate.

8. A composition comprising an intimate mixture of polyvinyl chloride and di(methacrylyloxyethyl) fumarate.

9. A composition comprising an intimate mixture of polyvinyl chloride and di(methacrylyloxyethyl) maleate.

10. A composition comprising an intimate mixture of polyvinyl chloride and di(methacrylyloxypropyl) phthalate.

11. A composition comprising an intimate mixture of a vinyl chloride polymer selected from the group consisting of polymerized vinyl chloride monomers and the copolymers of such monomers with an ethylenically unsaturated monomer, at least 50% of the monomer units of said copolymers being vinyl chloride units, and an acrylyloxyalkyl ester of the formula

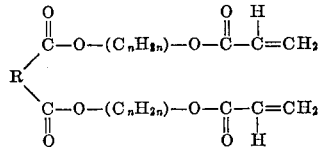

wherein:
R is a member of the group consisting of alkylene of 2 to 20 carbon atoms, alkenylene of 2 to 20 carbon atoms, phenylene and naphthylene, and
$n$ is an integer from 2 to 10; said acrylyloxyalkyl ester being present in amounts of from about 5 to about 200 parts by weight per 100 parts by weight of vinyl chloride polymer.

12. A composition as defined in claim 11 wherein the acrylyloxyalkyl ester is present in amounts of from about 20 to about 100 parts by weight per 100 parts by weight of vinyl chloride polymers.

13. The composition of claim 11 wherein the vinyl chloride polymer is polyvinyl chloride.

14. A composition comprising an intimate mixture of polyvinyl chloride and di(methacrylyloxyethyl)adipate.

15. A composition comprising an intimate mixture of polyvinyl chloride and di(acrylyloxyethyl) phthalate.

References Cited
UNITED STATES PATENTS

| | | | |
|---|---|---|---|
| 1,733,639 | 10/1929 | Schaack | 260—475 |
| 2,744,877 | 5/1956 | Smith | 260—31.6 |
| 2,815,354 | 12/1957 | Wilkinson et al. | 260—475 |
| 3,074,905 | 1/1963 | Douglas | 260—884 |
| 3,149,087 | 9/1964 | Anagnostopoulos et al. | 260—485 |
| 3,179,616 | 4/1965 | Reinke | 260—884 |
| 3,188,165 | 6/1965 | Magat et al. | 260—884 |
| 3,221,043 | 11/1965 | Fekete et al. | 260—475 |

MURRAY TILLMAN, *Primary Examiner.*

J. T. GOOLKASIAN, *Assistant Examiner.*